United States Patent [19]
Yamasaki et al.

[11] 3,777,563
[45] Dec. 11, 1973

[54] FLOW-VELOCITY DETECTING DEVICE

[75] Inventors: Hiroo Yamasaki; Yoshio Kurita; Ichizo Ito, all of Tokyo, Japan

[73] Assignee: Yokogawa Electric Works, Ltd., Tokyo, Japan

[22] Filed: Dec. 17, 1971

[21] Appl. No.: 209,114

[30] Foreign Application Priority Data
Dec. 26, 1970 Japan.............................. 45/128849
Apr. 30, 1971 Japan.............................. 46/28671

[52] U.S. Cl. ............................... 73/194 B, 73/204
[51] Int. Cl. ............................................... G01f 1/00
[58] Field of Search ............................... 73/194, 204

[56] References Cited
UNITED STATES PATENTS
3,564,915   2/1971   Tomota et al. ....................... 73/194
2,870,305   1/1959   Ling................................... 73/204
3,085,431   4/1963   Yerman et al. ...................... 73/204
3,433,069   3/1969   Trageser............................. 73/204

FOREIGN PATENTS OR APPLICATIONS
44/1903   12/1966   Japan................................... 73/194

*Primary Examiner*—Herbert Goldstein
*Attorney*—Bryan et al.

[57] ABSTRACT

Flow metering apparatus of the type wherein a vortex generating element having a generally elongate cylindrical shape is placed transversely in a stream of fluid to produce on opposite sides of the element vortices which are shed in alternating fashion, and wherein the element is formed with openings at said opposite sides which are connected together through the interior of said element to produce therein an alternating fluid flow corresponding to the alternating shedding of vortices. To improve the sensitivity of detection of the alternating flow, especially at low velocities accompanied by substantial noise, the apparatus is provided with directionally sensitive flow detection means in the alternating flow, arranged to be responsive predominantly in a direction aligned with the direction of the alternating flow. The directionally sensitive flow detection means is formed: by a heated resistance wire having a nonuniform coating thereabout to vary heat transfer according to the direction of flow thereagainst; by a flow detector within an interior passageway arranged to have different flow resistances according to the direction of flow; or by flow diversion means positioned upstream of a flow detector to guide flow therearound for one direction of alternating flow, the opposite direction of flow being free to impinge upon the detector.

19 Claims, 18 Drawing Figures

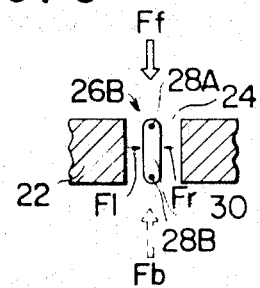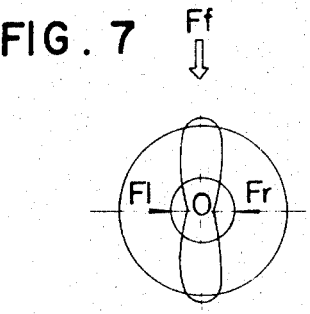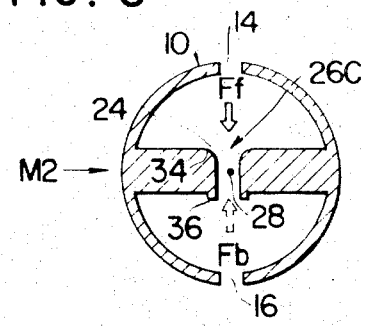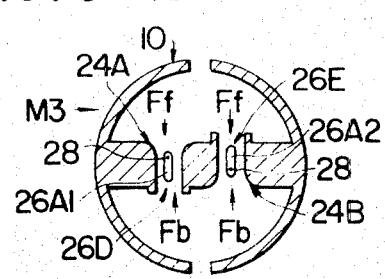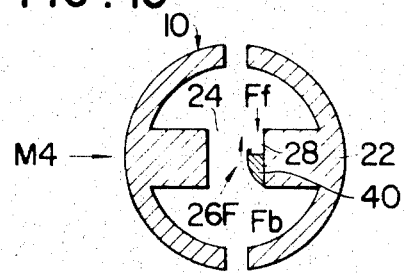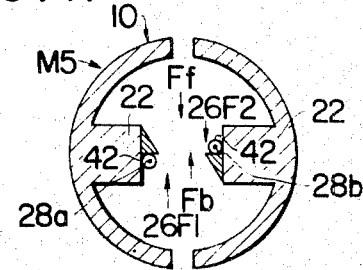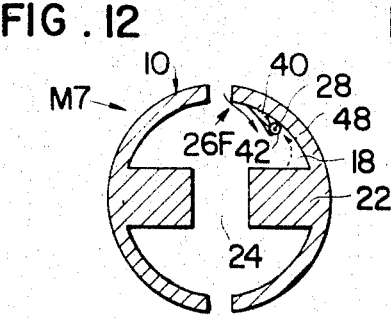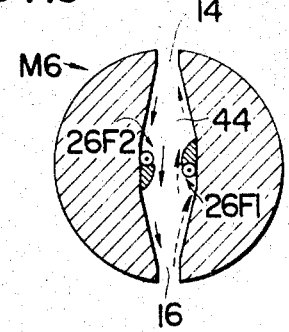

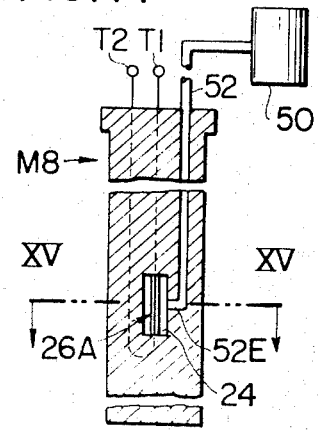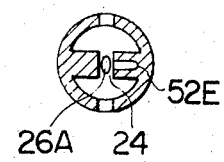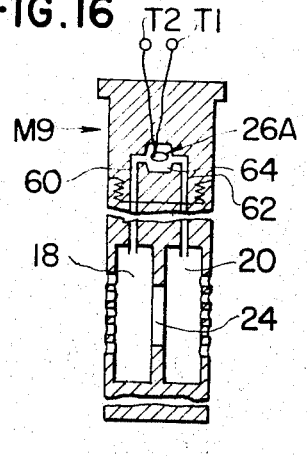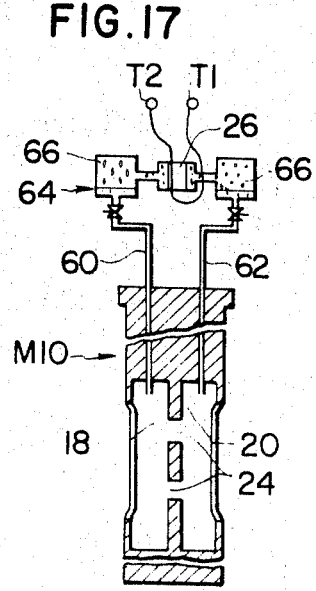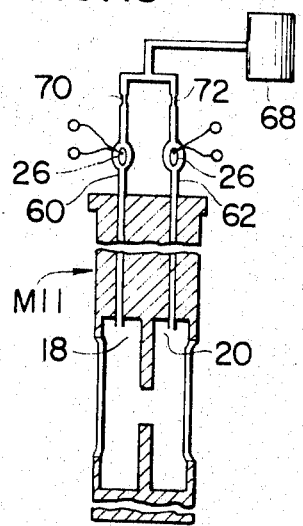

FLOW-VELOCITY DETECTING DEVICE

BACKGROUND OF THE INVENTION

1. Field of the Invention

This invention relates to flow metering apparatus of the type wherein a cylindrical object in a stream of flowing fluid produces a wake including a distinct pattern or vortices known as the Karman vortex street. The vortices are shed from alternate sides of the object in a periodic manner. There is a definate relationship between frequency $f$ of shedding of the vortices, the diameter $D$ of the cylinder, and the velocity $V$ of the stream, expressed by:

$$f = KD/D$$

where $f$ is a constant when flow is within a range of velocity $V$. Accordingly, it is possible to determine the flow velocity $V$ by measuring the frequency $F$ of the generation of vortices.

2. Description of the Prior Art

Various arrangements have been proposed for producing signals responsive to the rate of development of Karman's vortices as described above. In one such arrangement disclosed in U.S. Pat. No. 3,564,915, the cylindrical element is formed with openings in the regions where boundary layer separation occurs during the alternate shedding of vortices. The openings are connected together through the interior of the element to produce therein an alternating fluid flow corresponding to the alternating shedding of vortices. A flow detector, for example in the form of an electrically-heated wire, is positioned within the interior of the element to be responsive to the alternating fluid flow. The fluid flow alternating through the interior of the element assists in causing or retarding boundary layer separation for more reliable vortex production without influence from eddies and other fluid fluctuations.

Such prior art apparatus of the general type referred to above has not been fully satisfactory under certain conditions of flow. For example, at low flow velocities, e.g., in the order of 15 cm/sec, noise components of flow within the element in the region of the flow detector begin to approach in significance the signal components of alternating flow caused by vortex production, and accurate measurement becomes difficult. Accordingly, insufficient flow measurement sensitivity is available for low flow velocity.

SUMMARY OF THE INVENTION

Objects of the present invention are to provide flow metering apparatus having an element for generating Karman's vortices, in which apparatus the sensitivity of detection of vortex production is improved, especially at low rates of flow, the detection of noise components of flow is reduced, and the apparatus is more suitable for commercial use.

The flow metering apparatus according to the invention is of the type wherein a vortex generating element is placed in a stream of fluid to produce on opposite sides of the element vortices which are shed in alternating fashion, and wherein the element is formed with openings at said opposite sides which are connected together through the interior of the element to produce therein an alternating fluid flow corresponding to the alternating shedding of vortices. To detect the flow variations produced by the shedding of Karman's vortices, the flow metering apparatus is provided with directionally sensitive flow detection means within said alternating fluid flow the flow detection means being arranged to be responsive predominantly in a direction aligned with the direction of the alternating flow. This arrangement affords improved detection of vortex shedding by minimizing detection of noise flow components which are commingled with said alternating flow. The directionally sensitive flow detection means is provided, in one embodiment, by a flow detector responsive to heat transfer by fluid flow, for example, an electrically-heated wire, and means non-uniformly covering the flow detector to vary heat transfer therefrom according to the direction of impinging fluid flow. In another embodiment, the directionally sensitive flow detection means is provided by a similar flow detector in a passageway with a configuration offering different fluid resistances to the different directions of alternating flow therethrough to emphasize detection of one direction of flow. In still another embodiment, a similar flow detector has flow diversion means positioned upstream of the element for one direction of alternating flow, the opposite direction of flow being free to impinge on the flow detector.

Other objects, aspects and advantages of the invention will be pointed out in, or be apparent from, the detailed description hereinbelow, considered together with the following drawings.

DESCRIPTION OF THE DRAWINGS

FIG. 6 is a view similar to FIG. 4 showing a modified directionally sensitive flow detector;

FIG. 7 is a polar diagram relating sensitivity to angle of impinging flow for the detector of FIG. 6;

FIGS. 8–13 are cross-sectional views, similar to FIG. 1, illustrating other embodiments of flow metering apparatus according to the invention;

FIG. 14 is a sectional elevation similar to FIG. 2, illustrating a modified form of the invention including a purging system;

FIG. 15 is a section on line 15—15 of FIG. 14;

FIG. 16 is a sectional elevation, similar to FIG. 3, illustrating a modification of the invention;

FIGS. 17 and 18 are sectional elevations similar to FIG. 3, showing additional modifications of the invention.

DESCRIPTION OF THE PREFERRED EMBODIMENTS

Figure 1:
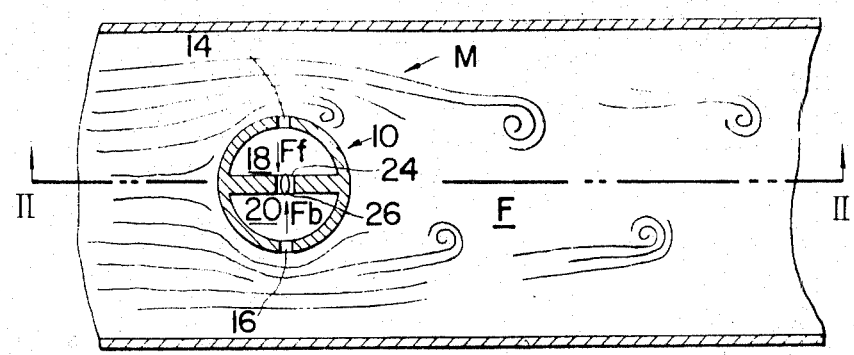
FIG. 1 is a cross-sectional view of flow metering apparatus according to the invention.

Referring first to FIG. 1, showing flow metering apparatus M, it is known that the insertion of apparatus M's cylindrical element 10 in a stream of flowing fluid F results in the periodic formation and shedding of vortices from alternate sides of the element. The element 10 typically is secured in place within the flowing fluid F by attachment to the wall of a pipe 12 as shown in FIG. 2.

Figure 2:
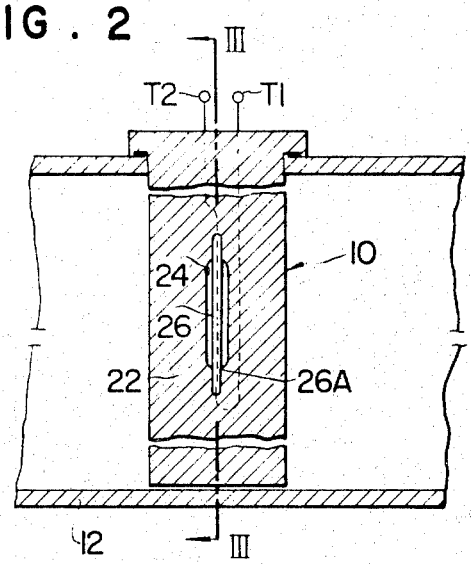
FIG. 2 is a section on line 2—2 of FIG. 1.
Figure 3:
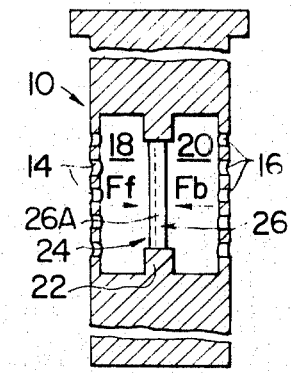
FIG. 3 is a section on line 3—3 of FIG. 2.
Figure 4:
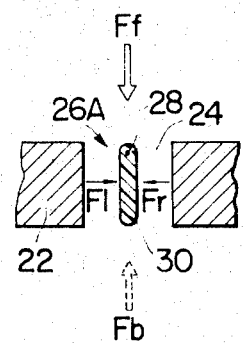
FIG. 4 is a portion of FIG. 1 enlarged in scale, showing the directionally sensitive flow detector of the present invention.

The vortex generating element 10, as shown in FIGS. 1 through 3, is formed on opposite sides thereof with respective sets of openings or holes 14 and 16. Each set of holes is arranged in a straight line parallel to the axis of the cylinder, and communicates with a corresponding interior cavity 18, 20. These cavities are separated by a central partition 22 having an opening 24 serving as a passageway to accomodate the flow of fluid therebetween.

When the vortices are shed from element 10, corresponding pressure fluctuations are produced next to the adjacent set of openings 14 and 16. Since the vortices are shed alternately from the opposite sides of the element, the pressures within the cavities 18, 20 also will fluctuate in an alternating fashion. These pressure fluctuations cause fluid to be displaced (i.e., to flow) through the opening 24 in an alternating fashion, first in one direction $Ff$ and then in a reverse direction $Fb$ as indicated by the arrows. The rate of flow alternation is proportional to the rate of generation of vortices, and this in turn is proportional to the rate of fluid flow through the pipe.

As indicated previously, when the velocity of fluid flow F through the pipe is low, the alternating flow through the opening 24 becomes infused with substantial noise flow components and detection of flow by means of, e.g., an electrically-heated wire, becomes difficult because the desired signal (the alternating flow) is of low magnitude and begins to become indistinguishable from the noise with resultant inaccuracy in measurement.

To overcome this problem and to provide for accurate measurement despite noise components, the present invention positions a directionally sensitive flow-sensing or detecting means 26 in the alternating flow in opening 24 in element 10. The detecting means 26 is arranged to be responsive predominantly in a direction aligned with the direction of the alternating flow, and thereby provides maximum sensitivity to signal components (the alternating flow) and minimum sensitivity to noise components (flow in other directions).

Figure 5:
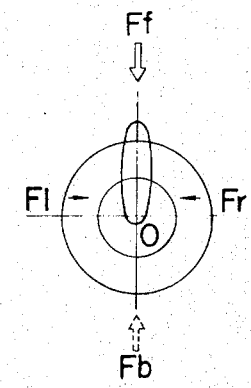
FIG. 5 is a polar diagram relating the sensitivity of the detector of FIG. 4 to the angle of impinging flow thereon.

The directionally sensitive flow detecting means 26, in the embodiment shown in FIGS. 1 through 4, takes the form of a detecting device 26A including a flow detector 28, such as an electrically-heated wire, responsive to heat transfer caused by fluid flow, and lying within a body 30 of limited heat transfer material such as a synthetic resin, furnishing a protective coating. As shown in greater detail in FIG. 4, the body 30 has an elongate cross-section, the long dimension of which is aligned with the alternating flow directions $Ff$ and $Fb$. Flow detector 28 is at one end of the elongate cross-section and hence is non-uniformly covered by body 30, which causes heat transfer to vary according to the angle at which flow impinges on device 26A. The sensitivity vs. angle pattern of device 26A is shown in FIG. 5 in relation to the alternating flows $Ff$ and $Fb$, and it can be seen that the direction of greatest sensitivity is the direction from which the flow $Ff$ arrives, while little sensitivity exists in the direction of flow $Fb$, as well as in the directions of side flow $Fl$ and $Fr$ representing noise components. Because detecting device 26A detects only one direction of alternating flow $Ff$, the frequency of the detection signal is only one-half that of the ordinary bi-directional detector. Hence a flow detector 28 having a response time constant twice as large can be employed, without lowering the overall detecting sensitivity of the flow measuring apparatus.

FIG. 6 illustrates a bi-directionally sensitive flow detection device 26B comprising elongate body 30 of resinous heat transfer material, and a pair of flow detectors 28A and 28B located within opposite ends of the elongate body 30. The sensitivity pattern of combined flow detectors 28A and 28B in device 26B is shown in FIG. 7, and it can be seen that greatest sensitivity occurs in the directions of alternating flow $Ff$ and $Fb$, while the directions of noise components $Fl$ and $Fr$ provide minimum sensitivity.

Flow detectors 28, 28a and 28b in devices 26A and 26B typically comprise an electrically heated wire the ends of which are connected to external terminals T1 and T2. The terminals are adapted to be coupled to a conventional sensing circuit (not shown) which produces a flow of electrical current through the wire, and also measures the change in resistance in the wire resulting from the alternating flow accompanying the generation of Karman's vortices.

FIg. 8 illustrates flow metering apparatus M2 with a directionally sensitive flow detecting device 26C of a different type. As shown, opening 24 in partition 22 is provided with a shape, including enlarged curved leading edges 34 and narrowed projecting trailing edges 36, designed to provide a lesser flow resistance for one direction of alternating flow $Ff$ and a greater flow resistance for the other direction of alternating flow $Fb$. A flow detector 28 is positioned within opening 24, and responds predominantly to the greater flow in the direction $Ff$.

FIG. 9 illustrates flow metering apparatus M3 including directionally sensitive flow detection devices 26D and 26E which are similar to device 26C shown in FIG. 8, having passageways 24A and 24B shaped to provide different flow resistances for the two directions of alternating flow. Passageway 24A has its lower flow resistance aligned with one direction of alternating flow $Ff$, while passageway 24B has its direction of lower flow resistance aligned with the opposite direction of alternating flow $Fb$. In addition, detection devices 26D and 26E comprise, in openings 24A and 24B, flow detection devices 26A1 and 26A2 constructed in the manner of flow detection device 26A and therefore directionally sensitive. As FIG. 9 shows, flow detection device 26A1 is arranged so its direction of greatest sensitivity coincides with the direction of lesser flow resistance of opening 24A so that flow detection device 26D has heightened sensitivity to one direction of alternating flow $Ff$. Similarly, flow detection device 26A2 and opening 24B have their directions of greatest sensitivity lying in the same direction to heighten the sensitivity of flow detection device 26E to the other direction of alternating flow $Fb$.

FIGS. 10 through 13 illustrate flow metering apparatus incorporating a directionally sensitive flow detection device 26F of a different type. Flow metering apparatus M4, shown in FIG. 10, positions in opening 24 a directionally sensitive device 26F comprising a flow detector 28 as described previously, and a flow diversion body 40 positioned upstream of the flow detector 28 for one direction of alternating flow $Fb$, to guide that direction of flow around the flow detector 28, for reduced detection, the opposite direction of alternating flow $Ff$ being free to impinge upon flow detector 28 for maximum detection. The flow diversion body 40, as illustrated, is contoured to guide flow around flow detector 28 and is secured to partition 22. An important advantage of flow detection device 26F is that it permits the flow detector 28, generally of fragile construction, to be easily secured to a rear wall of flow diversion body 40 where it is solidly supported and free from harm.

Flow metering apparatus M5 illustrated in FIG. 11 comprises a pair of directionally sensitive flow detection devices 26F1 and 26F2, similar to device 26F, mounted on partition 22 arranged to be sensitive to opposite directions of alternating flow. In addition, flow detectors 28a and 28b of devices 26F1 and 26F2 are each covered with a body 42 of material such as glass to provide a dust and mist resistant covering for the flow detectors, and are each mounted on partition 22. As shown in FIG. 13, the directionally sensitive flow detecting devices 26F1 and 26F2 may be located in a flow metering apparatus M6 in any arbitrary passageway 44 extending between openings 14 and 16 and having an alternating flow therein resulting from the generation of Karman's vortices.

FIG. 12 illustrates flow metering apparatus M7 in which flow detection device 26F is located within cavity 18, on an outside wall 48 thereof, rather than on partition 22. The alternating flow along cavity wall 48 is detected in the same manner as the alternating flow in opening 24, one direction of flow being diverted by flow diversion body 40, the opposite direction of alternating flow being free to impinge upon flow detector 28 within protective covering 42.

Although the flow diversion bodies 40 are illustrated in FIGS. 10 through 13 as separate structures attached to the vortex generating element 10, they may also be formed as an integral part of the vortex generating element. The flow diversion body 40 need only provide a cross-sectional shape, such as the triangular shape illustrated, or another shape, which will divert one direction of alternating flow around flow detector 28 and be of a length sufficient to guide flow around the active length of flow detector 28.

FIGS. 14 and 15 illustrate flow metering apparatus M8 which is similar to the flow metering apparatus M illustrated in FIGS. 1 through 4, but which includes a source 50 of purging fluid, such as air, coupled through a passageway 52 to opening 24, the end portion 52E of passageway 52 directing the purging fluid against flow detecting device 26A from the side thereof to keep it free from buildup of foreign matter which may be present in the flowing fluid F. Because flow detection device 26A has little sensitivity in the side direction from which the purging fluid impinges, as shown in the diagram of FIG. 5, the purging fluid thus has little degrading effect on detection of alternating flow and its use does not significantly reduce the sensitivity of detection.

FIGS. 16, 17 and 18 illustrate flow metering apparatus with remote detection of the type described in copending application Ser. No. 108,731, filed Jan. 22, 1971, titled Flow Measuring Apparatus. In such flow metering apparatus, the two cavities 18, 20 are coupled by pressure conduits 60, 62 through a region 64 remote from the cavities 18, 20 where detection can take place free from contaminating contact with the flowing fluid F with reduced possibility of damage to the detector due to coating by contaminants or other adverse effects. In flow metering apparatus M9 illustrated in FIG. 16, the directionally sensitive detection means 26, in the form of device 26A, is located within pressure conduits 60 or 62 or region 64, and is arranged as before to be responsive predominantly in a direction aligned with the direction of alternating flow through conduits 60, 62. FIG. 17 illustrates flow metering apparatus M10 using a sealing fluid 66 which is lighter than the fluid being measured and therefore remains up in the region 64 so as to provide a positive seal to isolate the region from the fluid being measured. The sealing fluid has an alternating flow caused by and corresponding to the alternating flow in conduits 60, 62, and directionally sensitive flow detection means 26 is located in sealing fluid 66 so as to be responsive predominantly in a direction aligned with the direction of alternating flow therein. In flow metering apparatus M11 shown in FIG. 18, a source 68 of purging fluid is coupled through throttle valves 70, 72 to conduits 60, 62 to provide a constant pressure source of purging fluid through the conduits into cavities 18, 20. The alternating flow of fluid in cavities 18, 20 produces a corresponding alternate flow of purging fluid within conduits 60, 62, and directionally sensitive flow detection means 26 are located in each of conduits 60, 62 and are arranged to be responsive to opposite directions of the alternating flow of purging fluid therein.

Although directionally sensitive flow detection devices 26A of the type illustrated in FIGS. 1 through 4 have been shown in the flow metering apparatus of FIGS. 14 through 18, it will be apparent that the other directionally sensitive flow detection means as illustrated in FIGS. 6 through 13 could be substituted therefrom. Similarly, although vortex generating elements 10 with rows of holes 14 and 16 and a single opening 24 have been illustrated, slots and other passageways may be substituted.

Although specific embodiments of the invention have been disclosed herein in detail, it is to be understood that this is for the purpose of illustrating the invention and should not be construed as necessarily limiting the scope of the invention since it is apparent that many changes can be made to the disclosed structures by those skilled in the art to suit particular applications.

We claim:
1. Flow metering apparatus of the type wherein a vortex generating element is placed transversely in a stream of fluid to produce on opposite sides of the element vortices which are shed in alternating fashion, and wherein the element is formed with openings at said opposite sides which are connected together through the interior of said element to produce therein an alternating fluid flow corresponding to the alternating shedding of vortices, such apparatus being characterized by
   directionally sensitive flow detection means in said alternating flow and comprising a flow detector of the type including a source of heat and being responsive to heat transfer by fluid flow, and means nonuniformly covering the flow detector to vary heat transfer therefrom according to the direction of impinging fluid flow,
   said flow detection means being arranged to be responsive predominantly in a direction aligned with the direction of said alternating flow,
   whereby the detection of vortex shedding is improved by minimizing detection of noise components mingled with said alternating flow.

2. Flow metering apparatus as claimed in claim 1 wherein said covering means comprises a body of heat transfer material having an elongate cross-section, and wherein said flow detector is a wire positioned within said body at one end of said elongate cross-section, whereby said flow detection means is sensitive to flow in one direction of said alternating flow.

3. Flow metering apparatus as claimed in claim 1 wherein said covering means comprises a body of heat transfer material having an elongate cross-section, and wherein said flow detector comprises a pair of wires positioned within said body at opposite ends of said elongate cross-section, whereby said flow detection means is sensitive to flow in both directions of said alternating flow.

4. Flow metering apparatus as claimed in claim 1 wherein said covering means comprises a pair of bodies of heat transfer material each having an elongate cross-section, and wherein said flow detector comprises a pair of wires each positioned one in each of said bodies at an end of said elongate cross-section, the wires being arranged to be responsive each in a different direction of said alternating flow.

5. Flow metering apparatus as claimed in claim 4 wherein the openings at the opposite sides of said vortex generating element are connected through a pair of passageways in the interior of said element, and wherein said two bodies are located one in each of said passageways.

6. Flow metering apparatus as claimed in claim 1 wherein the vortex generating element is of the type formed with interior cavities communicating through said openings, said cavities being connected by an internal passageway permitting fluid to flow between said cavities, and with pressure conduit means at least partly within said vortex generating element connecting said cavities together through a region which is remote from said cavity openings and remote from said internal passageway, the shedding of vortices producing an alternately fluid flow in said pressure conduit means, and wherein said directionally sensitive flow detection means is positioned in the alternating fluid flow said pressure conduit means.

7. Flow metering apparatus as claimed in claim 6 further comprising a pressure-transmitting sealing fluid in said pressure conduit means responding to the production of vortices with an alternating flow, said directionally sensitive flow detection means being located within said alternately flowing sealing fluid.

8. Flow metering apparatus as claimed in claim 6 further comprising a source of purging fluid connected to said pressure conduit means in said remote region for flow toward said cavities so that said purging fluid responds to the production of vortices with an alternating flow in said pressure conduit means, said directionally sensitive flow detection means being positioned within said purging fluid.

9. Flow metering apparatus of the type wherein a vortx generating element is placed transversely in a stream of fluid to produce on opposite sides of the element vortices which are shed in alternating fashion, and wherein the element is formed with openings at said opposite sides which are connected together through the interior of said element to produce therein an alternating fluid flow corresponding to the alternating shedding of vortices, such apparatus being characterized by directionally sensitive flow detection means in said alternating flow, said flow detection means being arranged to be responsive predominantly in a direction aligned with the direction of said alternating flow and comprising means in the interior of said element forming a passageway between said openings for said alternating flow, said passageway having a configuration providing different resistances to the opposite directions of alternating fluid flow therethrough and least resistance in one direction of alternating flow, and a flow detector of the type including a source of heat and being responsive to heat transfer caused by fluid flow positioned within said passageway, whereby the detection of vortex shedding is improved by minimizing detection of noise components mingled with said alternating flow.

10. Flow metering apparatus as claimed in claim 9 further comprising means nonuniformly covering the flow detector to vary heat transfer therefrom according to the direction of impinging flow, said covering means being arranged to provide for response to be predominantly in the direction of flow meeting the least resistance through said passageway.

11. Flow metering apparatus as claimed in claim 9 further comprising a second passageway connecting said two openings, said second passageway having a configuration providing different fluid resistances for the different directions of alternating flow, said second passageway having its direction of least fluid resistance lie in a direction opposite to that of said first passageway, and a second flow detector positioned within said second passageway.

12. Flow metering apparatus as claimed in claim 11 further comprising means nonuniformly covering the first and second flow detectors to vary heat transfer therefrom according to the direction of impinging fluid flow, each of said flow detectors being arranged within its passageway to respond predominantly in the direction of fluid flow meeting the least fluid resistance through said passageway.

13. Flow metering apparatus of the type wherein a vortex generating element is placed transversely in a stream of fluid to produce on opposite sides of the element vortices which are shed in alternating fashion, and wherein the element is formed with openings at said opposite sides which are connected together through the interior of said element to produce therein an alternating fluid flow corresponding to the alternating shedding of vortices, such apparatus being characterized by directionally sensitive flow detection means in said alternating flow, said flow detection means being arranged to be responsive predominantly in a direction aligned with the direction of said alternating flow and comprising a flow detector of the type including a source of heat and being responsive to heat transfer caused by fluid flow, and flow diversion means positioned upstream of the flow detector for one direction of alternating flow to guide that direction of flow around the flow detector, the opposite direction of flow being free to impinge upon the flow detector, whereby the detection of vortex shedding is improved by minimizing detection of noise components mingled with said alternating flow.

14. Flow metering apparatus as claimed in claim 13 wherein said directionally sensitive flow detection means further comprises a second flow detector responsive to heat transfer caused by fluid flow, and second flow diversion means positioned upstream of said second flow detector for said opposite direction of alternating flow for guiding said flow therearound, said first direction of alternating flow being free to impinge upon said second flow detector whereby said two flow detectors are responsive to different directions of said alternating flow.

15. Flow metering apparatus as claimed in claim 13 wherein said flow detector is mounted on said flow diversion means and comprises a wire varying its resistance characteristic according to temperature.

16. Flow metering apparatus as claimed in claim 13 wherein said flow detector comprises a resistance wire, and wherein said flow diversion means comprises a flow control body having a length sufficient to guide flow around the length of the resistance wire and being mounted throughout its length to said vortex generating element.

17. Flow metering apparatus as claimed in claim 16 wherein said vortex generating element is formed with interior cavities communicating with said openings, said cavities being connected by an internal passageway permitting fluid to flow between said cavities, and wherein said flow control body is mounted within said internal passageway.

18. Flow metering apparatus as claimed in claim 16 wherein said vortex generating element is formed with interior cavities communicating with said openings, said cavities being connected by an internal passageway permitting fluid to flow between said cavities, and wherein said flow control body is mounted inside one of said cavities.

19. Flow metering apparatus of the type wherein a vortex generating element is placed transversely in a stream of fluid to produce on opposite sides of the element vortices which are shed in alternating fashion, and wherein the element is formed with openings at said opposite sides which are connected together through the interior of said element to produce therein an alternating fluid flow corresponding to the alternating shedding of vortices, such apparatus being characterized by directionally sensitive flow detection means in said alternating flow, said flow detection means being arranged to be responsive predominantly in a direction aligned with the direction of said alternating flow, and a source of purging fluid directed against said directionally sensitive flow detection means from a direction of reduced sensitivity, thereby to purge said detection means without proportionally adding noise components to be detected, whereby the detection of vortex shedding is improved by minimizing detection of noise components mingled with said alternating flow.

* * * * *

UNITED STATES PATENT OFFICE
CERTIFICATE OF CORRECTION

Patent No. 3,777,563          Dated December 11, 1973

Inventor(s) HIROO YAMASAKI, et al.

It is certified that error appears in the above-identified patent and that said Letters Patent are hereby corrected as shown below:

Column 1, line 15     Reads:    f = KD/D

Should Read:    f = KV/D

Signed and sealed this 16th day of April 1974.

(SEAL)
Attest:

EDWARD M. FLETCHER, JR.            C. MARSHALL DANN
Attesting Officer                   Commissioner of Patents